Figure 1:
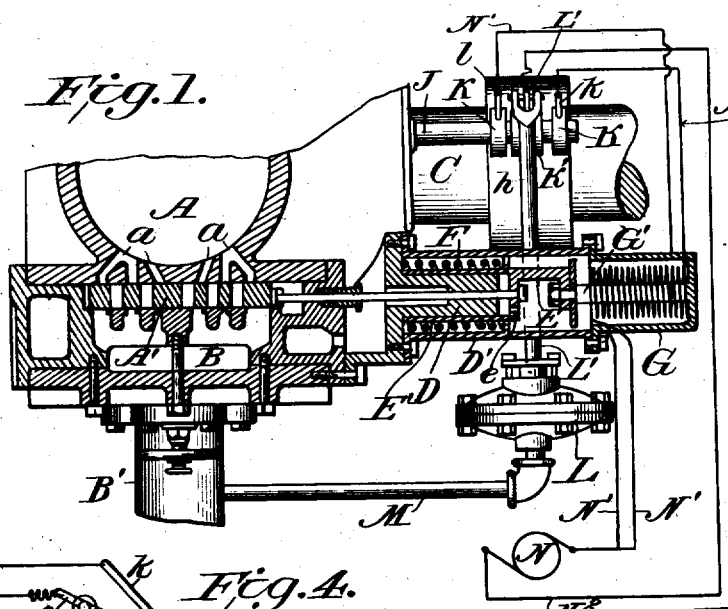

R. C. STEVENS.

ENGINE VALVE GEAR.

APPLICATION FILED JAN. 12, 1914.

Reissued Mar. 3, 1914.

13,694.

Inventor

Robert C. Stevens

Witnesses

C. M. Waeker.

Edith L. Smith

By John A. Bonnhardt

Attorney

NORRIS PETERS, INC. LITHO., WASHINGTON, D. C.

UNITED STATES PATENT OFFICE.

ROBERT C. STEVENS, OF ERIE, PENNSYLVANIA, ASSIGNOR TO SKINNER ENGINE COMPANY, OF ERIE, PENNSYLVANIA, A CORPORATION OF PENNSYLVANIA.

ENGINE VALVE-GEAR.

13,694. Specification of Reissued Letters Patent. Reissued Mar. 3, 1914.

Original No. 1,072,786, dated September 9, 1913, Serial No. 744,203. Application for reissue filed January 12, 1914. Serial No. 811,759.

*To all whom it may concern:*

Be it known that I, ROBERT C. STEVENS, a citizen of the United States, residing at Erie, in the county of Erie and State of Pennsylvania, have invented certain new and useful Improvements in Engine Valve-Gear; and I do hereby declare that the following is a full, clear, and exact description of the invention, such as will enable others skilled in the art to which it appertains to make and use the same, reference being had to the accompanying drawings, and to the letters of reference marked thereon, forming part of this specification.

My invention relates to engine valve gear, and has for its object the provision of mechanism for operating the exhaust valves of that type of engine shown and described in U. S. Letters Patent No. 1,033,280 issued July 23, 1912, to Skinner and Williams, which are adapted to be used either as a non condensing engine or a condensing engine, as may be desired, by connecting or disconnecting the operating gear of the exhaust valves, whereby, when the vacuum in the exhaust pipe of the engine, when operating as a condensing engine, is broken, the exhaust valve of the engine will be started into operation automatically, and will continue to operate the engine as a non condensing engine until the vacuum in the exhaust pipe is restored, when the operation of the exhaust valves will cease and they will remain closed and the engine thereby will automatically become a condensing engine. The type of engine to which such a valve gear is applicable, is fully shown and described in the above mentioned Letters Patent, and is what is known as a central exhaust engine, viz:—an engine having exhaust ports located at the central portion of the cylinder, which central exhaust ports are covered and uncovered by the engine piston during its reciprocations, the vacuum in the exhaust being communicated to the cylinder at either end of the same, when the central exhaust ports are uncovered by the piston, to a sufficient degree to prevent excessive compression in the cylinder during the return stroke of the piston. When, however, the vacuum in the exhaust pipe is destroyed, and the engine is desired to be operated as a non condensing engine, it is necessary to provide auxiliary exhaust ports and valves intermediate between the central exhaust ports, and the ends of the cylinder, which auxiliary exhaust valves are only operated when the pressure in the cylinder has been relieved by the uncovering of the central exhaust ports by the piston, and said auxiliary exhaust valves remain open until the auxiliary ports are covered by the return stroke of the piston when they are closed, thus making it possible to operate the auxiliary exhaust valves, to open and close the same, when there is no pressure thereon.

The features of my invention are hereinafter set forth and described in the accompanying drawings, in which:—

Figure 4:
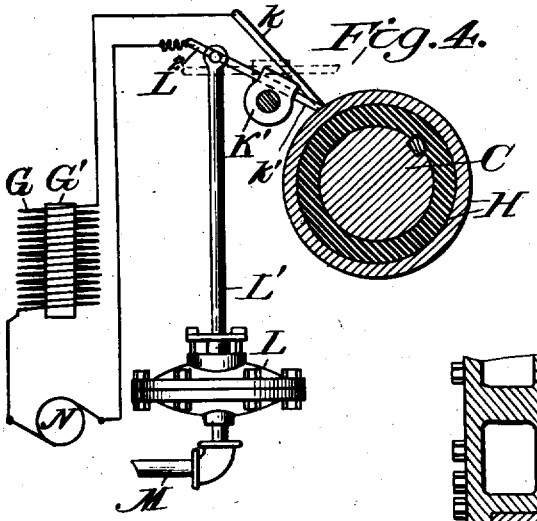
Figure 3:
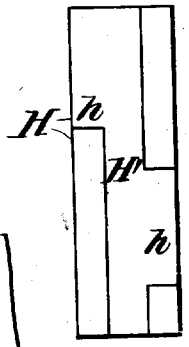
Figure 2:
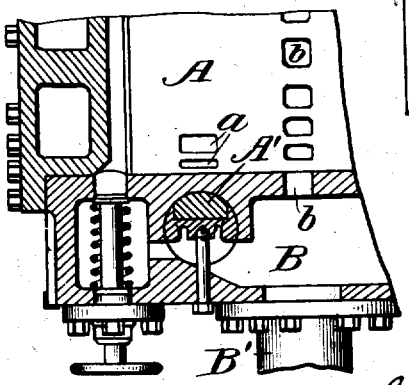

Figure 1, is a transverse section of an engine cylinder, through the auxiliary exhaust ports and valve mechanism thereof, embodying my invention. Fig. 2, is a longitudinal section of a portion of a central exhaust engine having an auxiliary exhaust valve. Fig. 3 is a plan view of the commutator ring broken open and laid out flat. Fig. 4 is a diagrammatic view of my automatic valve gear.

In these drawings, A, indicates an engine cylinder, *a*, indicates auxiliary exhaust ports, A′, indicates an auxiliary exhaust valve, $A^2$, indicates the valve-stem of said valve, B, indicates the exhaust chamber, B′, indicates the exhaust pipe thereof, *b*, indicates the central exhaust ports (see Fig. 2) and C, indicates the engine shaft, all of which parts are of usual and ordinary construction in steam engines of this type.

In carrying out my invention I secure upon the valve-housing D, of the valve stem $A^2$, a support D′, constructed of non magnetic material, and within this support D′, upon the valve-stem $A^2$, I secure a yoke E, of non-magnetic material, having a cylindrical port E′, embracing the valve-stem housing D, upon which cylindrical portion E′, I place a spring F, adapted to maintain the auxiliary exhaust valve A′, in normally closed position, as shown in Fig. 1. The cylinder E′, is preferably provided with a small opening or air-vent *e*, to permit of a slow closing of the valve A′, and prevent all noise and jar of a too rapid closing of the valve. Upon the outer end of the support D′, I secure an electro-magnetic device G, preferably a solenoid, and secure the core G′, thereof to the yoke E.

Upon the shaft C, of the engine, I secure a commutator H, having around its periphery an electric conductor H′, said conductor being provided with lateral extensions *h*. To the side of the engine frame adjacent to the shaft C, I secure a brush support J, and on this brush support J, I non-rotatably secure brush holders K, adapted to hold brushes *k*, in a position adapted to contact with the lateral extensions *h*, of the conductor H′, on the commutator H. Upon the brush support J, between the brush holders K, I also place a brush holder K′, so that said brush holder K′, may be rotated on the support J. For rotating or rocking the brush holder K′, on the support J, I provide a pneumatic mechanism L, preferably of the diaphragm type, having a piston-rod or stem L′, which is connected with an arm $L^2$, on the brush holder K′, and for operating the pneumatic mechanism L, I provide a pipe connection M, leading therefrom into the exhaust pipe B′, of the engine. For operating the electro-magnetic device G, I provide an electric generator N, with an electric conductor N′ leading from one pole of said generator to one of the poles of the electro-magnetic device G, and with another electric conductor $N^2$, leading from the opposite pole of said generator N, to the oscillatory brush-lever $L^2$, and from one of the stationary brushes *k*, to the opposite pole of the electro-magnetic device G.

In operation, when the engine is operating as a condensing engine the vacuum in the exhaust pipe B′, is communicated to the pneumatic mechanism L, through the pipe M, and operates to draw the rod L′, downward, thereby raising the brush *k*′, secured in the oscillatory brush holder K′, out of contact with the conductor H′, on the commutator H, thereby breaking the electric circuit from the generator N, through the electro-magnetic device G, and permitting the spring F, to retain the auxiliary exhaust valve A′, in a closed position as shown in Fig. 1. When, however, the vacuum in the exhaust pipe B′, is absent, the pneumatic mechanism L, is thereby released and the rod L′, permitted to move upward thereby causing the brush *k*′ to contact with the conductor H′, on the commutator H, thus restoring the circuit from the generator N, through the electro-magnetic device G, and thereby operating the auxiliary exhaust valve A′, and transforming the engine from a condensing engine into a non-condensing engine automatically.

Having thus fully described the construction and operation of my invention so as to enable others to utilize the same, what I claim as new and desire to secure by Letters Patent is:—

1. The combination in an engine valve gear, of an exhaust valve, a stem secured thereto, a spring adapted to maintain said valve in a normally closed position, an electro-magnetic device connected to said valve stem, an engine shaft, a commutator adapted to rotate in unison with said shaft, brushes adapted to contact with said commutator, an electric generator, an electric circuit leading from said generator to said electro-magnetic device, and to said brushes and a pneumatic mechanism communicating with the exhaust of the engine adapted to be actuated by vacuum to make and break said electric circuit, substantially as and for the purpose set forth.

2. The combination in an engine valve gear, of an exhaust valve, a stem secured thereto, a spring adapted to maintain said valve in a normally closed position, an electro-magnetic device connected to said valve stem, an engine shaft, a commutator adapted to rotate in unison with said shaft, a continuous electric conductor on said commutator, lateral extensions on said conductor, brushes adapted to contact with said commutator, an electric generator, an electric circuit leading from said generator to said electro-magnetic device, and to said brushes, and a pneumatic mechanism communicating with the exhaust of the engine adapted to be actuated by vacuum to operate said brushes to make and break said electric circuit, substantially as and for the purpose set forth.

3. The combination in an engine valve gear, of an exhaust valve, a stem secured thereto, a spring adapted to maintain said valve in a normally closed position, a solenoid coil, a core within said coil attached to said valve stem, an engine shaft, a commutator on said shaft, an electric conductor on said commutator, a brush-holder support, an oscillatory brush holder on said support, a brush secured in said holder adapted to contact with said commutator, a generator, an electric circuit between said generator through said brushes and commutator, a stationary brush holder on said support, a brush secured thereon adapted to contact with said commutator to said solenoid, a pneumatic diaphragm mechanism in communication with the exhaust of the engine, and rod and lever mechanism adapted to operate said oscillatory brush holder to raise the brush secured therein out of contact with said commutator, substantially as and for the purpose set forth.

4. In a valve-controlling mechanism for steam engines, the combination with an exhaust valve, of electric devices for operating the same, and means governed by the vacuum in the exhaust pipe of the engine for controlling the operation of said electric devices.

5. The combination of a steam engine cylinder having main and auxiliary exhaust ports, a valve controlling the auxiliary exhaust port, means to hold said valve closed when the engine is running condensing, electric devices for operating the said valve when the engine is running non-condensing, and means governed by the vacuum in the exhaust pipe for controlling the operation of said electric devices.

6. The combination of a steam engine cylinder, an exhaust valve, electric devices for operating said valve, and means governed by variation of pressure in the exhaust pipe to control the operation of said electric devices.

7. The combination of a steam engine cylinder having main and auxiliary exhaust ports, a valve controlling the auxiliary exhaust port, a spring tending to hold said valve closed, electric devices operative to open said valve at proper times, and means governed by the presence or absence of vacuum in the exhaust pipe for controlling the operation of said electric devices, whereby said valve will remain closed when the engine is running condensing.

8. In a valve-controlling mechanism for steam engines, the combination with an auxiliary exhaust valve, and means tending hold said valve closed, of electric devices for opening said valve according to the operation of the engine, and pneumatic devices connected to the exhaust pipe of the engine and controlled by the vacuum therein for holding the circuit of said devices open and preventing the operation thereof when sufficient vacuum exists.

9. In a valve-controlling mechanism for steam engines, the combination with a cylinder having main and auxiliary exhaust ports, of a valve for the auxiliary exhaust port, a spring tending to close said valve, electric devices for opening said valve, including a circuit, and circuit closing members controlled by the operation of the engine, and means governed by vacuum in the exhaust pipe, for controlling the operation of said circuit-closing members and operative to hold said circuit closing members open when sufficient vacuum exists.

In testimony whereof I affix my signature in the presence of two witnesses.

ROBERT C. STEVENS.

Witnesses:
L. E. Barnes,
John M. Connell.

Copies of this patent may be obtained for five cents each, by addressing the "Commissioner of Patents, Washington, D. C."